(12) United States Patent
Atwood et al.

(10) Patent No.: US 6,221,968 B1
(45) Date of Patent: Apr. 24, 2001

(54) PROCESS FOR PRODUCING SPECIFIC TAPERED BLOCK COPOLYMERS

(75) Inventors: Harvey Emerson Atwood, Kingwood; Michael John Modic, Richmond; Barry Collins Moore, Cypress, all of TX (US); John Louis Scheve, Marietta; Christine Marie Christian, Vincent, both of OH (US)

(73) Assignee: Shell Oil Company, Houston, TX (US)

( * ) Notice: Subject to any disclaimer, the term of this patent is extended or adjusted under 35 U.S.C. 154(b) by 0 days.

(21) Appl. No.: 09/479,179

(22) Filed: Jan. 7, 2000

Related U.S. Application Data

(60) Provisional application No. 60/115,987, filed on Jan. 15, 1999.

(51) Int. Cl.⁷ ................................................. C08F 297/04
(52) U.S. Cl. ........................... 525/314; 525/316; 525/98; 524/504
(58) Field of Search ............................ 525/314, 98, 316; 524/504

(56) References Cited

U.S. PATENT DOCUMENTS

| | | |
|---|---|---|
| 3,700,633 | 10/1972 | Wald et al. . |
| 3,792,127 | 2/1974 | Gilles ................. 260/880 B |
| 4,918,130 | 4/1990 | Kano et al. .......... 524/499 |
| 4,939,208 | 7/1990 | Lanza et al. .......... 525/93 |
| 5,045,589 | 9/1991 | Ueno ................... 524/505 |
| 5,100,938 | 3/1992 | Vitkuske et al. ......... 524/68 |
| 5,100,939 | 3/1992 | Vitkuske et al. ......... 524/68 |
| 5,227,419 | 7/1993 | Moczygemba et al. ....... 524/128 |
| 5,234,999 | 8/1993 | Tung et al. ............ 525/314 |
| 5,256,734 | 10/1993 | Sugihara et al. ....... 525/98 |
| 5,510,423 | 4/1996 | Van Dijk et al. ...... 525/316 |
| 5,554,697 | 9/1996 | Van Dijk et al. ...... 525/314 |
| 5,717,035 | 2/1998 | Coolbaugh et al. . |

FOREIGN PATENT DOCUMENTS

| | | | |
|---|---|---|---|
| 2260592 | 5/1975 | (FR) . | |
| 58-029842 | 2/1983 | (JP) . | |
| 9227758 | 9/1997 | (JP) | ............... C08L/53/00 |
| WO 96/25442 | 2/1996 | (WO) | ........... C08F/297/04 |

*Primary Examiner*—James J. Seidleck
*Assistant Examiner*—Olga Asinovsky
(74) *Attorney, Agent, or Firm*—Donald F. Haas

(57) ABSTRACT

The present invention is a process for producing an anionic block polymer which comprises optionally anionically polymerizing styrene to form a homopolymer block of polystyrene, anionically polymerizing isoprene to form a hompolymer block of polyisoprene, and anionically copolymerizing styrene and isoprene to form a tapered copolymer block wherein the charge rate of both styrene and isoprene is from 15% to 75% by weight of the total tapered block monomer charge per minute and the weight ratio of the styrene to the isoprene is from 0.5:1 to 1.5:1. The process produces a unique polymer containing a tapered polymer block of styrene and isoprene which has a specific taper structure consisting of small segments of variable size of styrene monomers and isoprene monomers.

2 Claims, No Drawings

US 6,221,968 B1

PROCESS FOR PRODUCING SPECIFIC TAPERED BLOCK COPOLYMERS

This application claims the benefit of U.S. Provisional Application No. 60/115,987, filed Jan. 15, 1999, the entire disclosure of which is hereby incorporated by reference.

FIELD OF THE INVENTION

The present invention relates to a process for producing specific tapered block copolymers. More specifically, it relates to a process for producing a specific tapered hydrogenated triblock copolymer of styrene and isoprene.

BACKGROUND OF THE INVENTION

Block copolymers of vinyl aromatic hydrocarbons, such as styrene, and conjugated dienes, such as isoprene and butadiene, are well known. Generally, these are made by polymerizing a polymer block of one of the monomers, for instance, styrene, until all of the monomer is gone, introducing a second monomer and polymerizing it until all of it is gone, and so on. This process would produce block copolymers which have distinct homopolymer blocks. It is also possible to polymerize more than one monomer together to produce random copolymer blocks within the block copolymer.

In some situations, it has been found advantageous to create a random copolymer block within the block copolymer which is "tapered." A tapered block is a randomly copolymerized block wherein the conditions of polymerization are managed such that the concentration of one of the mers in the block copolymer is highest at one end of the polymer block and generally decreases in the direction of the other end of the polymer block so that the concentration of other mer is greatest at the other end. In these tapered block copolymers, the trend is as described previously but the distribution of the mers is still random.

It has been found that it would be advantageous to be able to produce a tapered polymer block in which the random nature of the distribution of the mers in the polymer block is dramatically decreased in comparison to the prior art tapered block copolymers. The present invention provides a process which allows the production of block copolymers having tapered blocks of styrene and isoprene having a specific taper structure which consists of small segments of variable size of styrene monomer and isoprene monomer wherein the concentration of the isoprene mers at one end of the polymer is high and gradually decreases in the direction of the other end of the polymer block but wherein the random distribution of the mers in the block is substantially decreased.

SUMMARY OF THE INVENTION

The present invention is a process for producing an anionic block polymer which comprises optionally anionically polymerizing styrene to form a homopolymer block of polystyrene, anionically polymerizing isoprene to form a hompolymer block of polyisoprene, and anionically copolymerizing styrene and isoprene to form a tapered copolymer block wherein the charge rate of both styrene and isoprene is from 15% to 75%, preferably 15 to 50%, by weight of the total tapered block monomer charge per minute, and the weight ratio of the styrene to the isoprene is from 0.5:1 to 1.5:1. The process produces a unique polymer containing a tapered polymer block of styrene and isoprene which has a specific taper structure consisting of small segments of variable size of styrene monomers and isoprene monomers.

Although the specification and claims refer to styrene and isoprene only, it is considered within the spirit of the invention to use any vinylaromatic hydrocarbon in the manner of styrene described herein and to use any conjugated diene in the manner of isoprene described herein.

DETAILED DESCRIPTION OF THE INVENTION

The polymers of this invention have at least one polyisoprene polymer block and at least one tapered polymer block as described below. The preferred hydrogenated block copolymer made by the process of the present invention has the structure $A_n$-B-(A/B)-$A_m$ wherein A is polystyrene homopolymer, B is an isoprene homopolymer, (A/B) is a block of a tapered isoprenepolystyrene copolymer, and n and m are 0 or 1. The tapered A/B portion of the block copolymer has mers of isoprene and styrene but the concentration of B mers is greatest at the end adjacent to the B homopolymer block and gradually decreases in the direction of the other end of the polymer so that the concentration of the A mers is greatest at that end of the polymer. The shape of the taper of the tapered block(s) is such that the random nature of the distribution of the isoprene and styrene mers throughout the polymer block is minimized. Generally, this means that styrene segments are incorporated between isoprene segments in the desired fashion.

The content of the styrene in the hydrogenated block copolymer may vary from 5 to 40% by weight, but is preferably 15 to 25% by weight, most preferably 18 to 22% by weight when the polymer is to be used in a polypropylene resin composition. The hydrogenated block copolymer can have a peak molecular weight from 50,000 to 150,000, preferably 70,000 and 125,000, more preferably 75,000 to 115,000, when it is to be used in a polypropylene resin composition.

The molecular weights of linear polymers or unassembled linear segments of polymers such as mono-, di-, triblock, etc., arms of star polymers before coupling are conveniently measured by Gel Permeation Chromatography (GPC), where the GPC system has been appropriately calibrated. For anionically polymerized linear polymers, the polymer is essentially monodisperse (weight average molecular weight/ number average molecular weight ratio approaches unity), and it is both convenient and adequately descriptive to report the "peak" (sometimes referred to as "apparent") molecular weight of the narrow molecular weight distribution observed. Usually, the peak value is between the number and the weight average. The peak (or apparent) molecular weight is the molecular weight of the main species shown on the chromatograph. For polydisperse polymers the weight average molecular weight should be calculated from the chromatograph and used. For materials to be used in the columns of the GPC, styrene-divinyl benzene gels or silica gels are commonly used and are excellent materials. Tetrahydrofuran is an excellent solvent for polymers of the type described herein. A refractive index detector may be used.

The hydrogenated block copolymer can be prepared in accordance with known living anionic polymerization methods in the presence of an alkyl lithium initiator in a hydrocarbon solvent. That is, for example, a desired amount of styrene is introduced in a reactor and then polymerization starts. Isoprene is polymerized to form an isoprene homopolymer.

The tapered block is polymerized by adding a mixture of the isoprene and styrene in absence of a randomizing agent and controlling the temperature of the reactor in the range of 10 to 120° C. The isoprene monomer is exhausted first and the end of the tapered block is formed of almost all homopolystyrene. The conditions for the preparation of the tapered copolymer block are as disclosed in U.S. Pat. No. 3,775,329 which is herein incorporated by reference.

The random nature of the distribution of the mers is controlled by introducing each of the monomers to the reactor at a rate of 15% to 75%, preferably 15 to 50%, by weight of the total tapered block monomer charge per minute, and using the monomers in amounts such that the weight ratio of the styrene to the isoprene ranges from 0.5:1 to 1.5:1. This facilitates dispersion of sufficiently small styrene segments between isoprene segments to produce desired finished product properties.

The resultant block copolymer may be hydrogenated in accordance with any one of the known methods (for example, the method as disclosed in U.S. Pat. No. 3,700,633 which is herein incorporated by reference) to obtain the hydrogenated block copolymer. In the hydrogenated block copolymer of the present invention, at least 80%, preferably at least 90%, more preferably at least 95% of the double bonds in the isoprene should be hydrogenated and saturated. The hydrogenation degree can be analyzed using the nuclear magnetic resonance (NMR) method. After the hydrogenation, the hydrogenated block copolymer can be recovered using the known method as a polymer crumb.

The polymer of the present invention may be used to make a polypropylene resin composition which is a mixture of a propylene-ethylene block copolymer and a minor amount of an impact modifier which contains at least 50% by weight of the hydrogenated block copolymer. The impact modifier may include up to 50% by weight of an olefinic rubber along with the tapered block copolymer. The olefin rubber may be any of the commonly used impact modifiers of this type including ethylene-propylene rubber, EPDM, and metallocene-based elastomers such as ethylene-butylene and ethylene-octene copolymers. This composition may have from 10 to 25% by weight talc. The talc is used to increase stiffness and dimensional stability of the part which is made from this composition. The polypropylene resin composition can be prepared by melt mixing (a) the propylene-ethylene block copolymer with (b) the hydrogenated block copolymer and then pelletizing. The polypropylene resin composition is useful in various molding methods such as injection molding, extrusion molding, compression molding, and hollow molding so as to prepare various moldings.

EXAMPLES

The present invention will be further explained by referring to the following non-limiting example. The polymers were made by first polymerizing styrene (Step I), then isoprene (Step II), and finally a mixture of styrene and isoprene (Step III) at the conditions shown in Table 1. Polymers 1526 to 1529 are comparative examples and polymer 1530 is within the scope of this invention.

TABLE 1

| Polymer | 1526 | 1527 | 1528 | 1529 | 1530 |
|---|---|---|---|---|---|
| Step I | | | | | |
| Styrene (kg) | 1048 | 1049 | 1049 | 1049 | 1049 |
| Maximum Temperature (° C.) | 54 | 54 | 53 | 53 | 52 |
| Final Temperature (° C.) | 34 | 35 | 33 | 33 | 33 |
| Step II | | | | | |
| Isoprene (kg) | 6627 | 6627 | 6627 | 6627 | 6260 |
| Maximum Temperature (° C.) | 66.5 | 67.2 | 63.3 | 64.4 | 63 |
| Step III | | | | | |
| Isoprene (kg) | 736.3 | 735.5 | 735.5 | 735.5 | 1105.5 |
| Isoprene Charge Rate (kg/min) | 90.5 | 90.5 | 87.3 | 90.5 | 181.8 |
| Styrene (kg) | 1050.9 | 1050.9 | 1050.9 | 1050.9 | 1050.9 |
| Styrene Charge Rate (kg/min) | 81.8 | 81.8 | 81.8 | 92.7 | 181.8 |
| Average Temperature (° C.) | 66.4 | 66.9 | 67.7 | 66.2 | 66.1 |

Table 2 shows the reaction conditions for polymers 1526 to 1530 as well as a number of other polymers. The important parameters, % tot/min and wt ratio styr/Ip are shown. % tot/min is the percentage by weight per minute of the total of that monomer (isoprene or styrene) introduced in the tapered block polymerization step. wt ratio styr/Ip is the weight ratio of styrene to isoprene in the step. 6392 is outside the scope of the invention and all of the other 6000 series and the 7000 series are within the scope.

TABLE 2

| | Tapered Block Isoprene | | | | Tapered Block Styrene | | | | | |
|---|---|---|---|---|---|---|---|---|---|---|
| Run/batch number | total (kg) | rate (kg/min) | % tot/min (min) | (max) | total (kg) | rate (kg/min) | % tot/min (min) | (max) | rate ratio Ip/Styr | wt ratio Styr/Ip |
| 6329* | 14.82 | 4.5–5.5 | 30 | 37.1 | 11.00 | 4.5–5.5 | 41 | 50 | | |
| 6339* | 11.44 | | 39 | 48.1 | 8.49 | | 53 | 64.8 | | |
| 6342* | 11.44 | | 39 | 48.1 | 8.49 | | 53 | 64.8 | | |
| 6343* | 13.21 | | 34 | 41.6 | 8.49 | | 53 | 64.8 | | |
| 6371 | 12.10 | 2.86 | 24 | | 8.98 | 3.5 | 39 | | 0.61 | 0.74 |
| 6372 | 9.55 | 1.45 | 15 | | 8.98 | 3 | 33 | | 0.45 | 0.94 |
| 6374 | 9.55 | 1.73 | 18 | | 8.98 | 1.75 | 20 | | 0.93 | 0.94 |
| 6376 | 12.10 | 1.84 | 15 | | 8.98 | 1.38 | 15 | | 0.99 | 0.74 |
| 6392 | 0.97 | 0.13 | 13 | | 1.37 | 0.12 | 9 | | 1.53 | 1.41 |
| 7067 | 7.98 | 1.84 | 23 | | 9.16 | 1.47 | 16 | | 1.44 | 1.15 |
| 7073 | 7.98 | 1.84 | 23 | | 9.16 | 1.47 | 16 | | 1.44 | 1.15 |
| 7077 | 0.60 | 0.14 | 23 | | 0.69 | 0.11 | 16 | | 1.46 | 1.15 |
| 7089 | 7.98 | 1.84 | 23 | | 9.16 | 1.47 | 16 | | 1.44 | 1.15 |

TABLE 2-continued

| Run/batch number | Tapered Block Isoprene | | | | Tapered Block Styrene | | | | rate ratio Ip/Styr | wt ratio Styr/Ip |
|---|---|---|---|---|---|---|---|---|---|---|
| | total (kg) | rate (kg/min) | % tot/min (min) | (max) | total (kg) | rate (kg/min) | % tot/min (min) | (max) | | |
| 7091 | 7.98 | 1.84 | 23 | | 9.16 | 1.47 | 16 | | 1.44 | 1.15 |
| 1526 | 736.30 | 90.5 | 12 | | 1050.90 | 81.8 | — | | 1.58 | 1.43 |
| 1527 | 735.50 | 90.5 | 12 | | 1050.90 | 81.8 | 8 | | 1.58 | 1.43 |
| 1528 | 735.50 | 87.3 | 12 | | 1050.90 | 81.8 | 8 | | 1.52 | 1.43 |
| 1529 | 735.50 | 90.5 | 12 | | 1050.90 | 92.7 | 9 | | 1.39 | 1.43 |
| 1530 | 1105.50 | 181.8 | 16 | | 1050.90 | 181.8 | 17 | | 0.95 | 0.95 |

*Charge rate is estimated for these 4 runs.

The block copolymers used were hydrogenated such that at least 98% of the double bonds were saturated. The properties of each of the thus-obtained hydrogenated copolymers are shown in Tables 3 and 4. Styrene content was determined by the nuclear magnetic resonance (NMR) method. The molecular weights of the block of the styrene homopolymer and the styrene segment distribution of the tapered segment were determined by subjecting a sample prior to the hydrogenation to ozone degradation in order to remove all of the isoprene segments. The resulting solution of styrene segments was then subjected to the gel permeation chromatography (GPC). The hydrogenated block copolymer was recovered as a solid crumb, which was used to prepare a polypropylene composition.

TABLE 3

| Block Copolymer | Polymer[1] Structure | Styrene Content (%) | Melt Flow[3] (g/10 min) | MW[2] of Polymer | Tensile[5] Strength (psi) |
|---|---|---|---|---|---|
| 1526 | S-EP-(S/EP) | 22.0 | 2.7[4] | 77.1 | 1696 |
| 1527 | S-EP-(S/EP) | 22.3 | 2.2 | 76.7 | 1577 |
| 1528 | S-EP-(S/EP) | 22.1 | 2.4 | 75.9 | — |
| 1529 | S-EP-(S/EP) | 22.2 | 2.5 | 75.3 | 1842 |
| 1530 | S-EP-(S/EP) | 22.2 | 3.8 | 76.3 | 1628 |

[1]EP : block of hydrogenated isoprene homopolymer
S/EP : block of hydrogenated isoprene-styrene tapered copolymer
S : block of styrene homopolymer
[2]The peak molecular weight ($\times 10^3$).
[3]ASTM D1238. 230° C./5 kg.
[4]Contaminated w/seal oil (off-spec batch)
[5]ASTM D412. 10"/min crosshead speed.

It can be seen in Table 3 that the polymer of the present invention, Polymer 1530, has roughly equivalent tensile strength to the other polymers. However, it has a significantly higher melt flow index. This translates into improved properties in the polypropylene compositions described above.

Table 4 shows the melt flow for these and several other polymers as well as the amount of tapering in the tapered block. This is determined by ozonolysis and GPC. The polymer outside the scope of this invention, 6392, has a significantly lower MFR than polymers 6329, 6371, and 6372 which are within the scope of the invention.

TABLE 4

S-EP-(S/EP) Copolymer Molecular Structure and Melt Flow Index

| Run/ Batch # | Polystyrene Block MW[2] | Tapered Block MW[2] | PSC, % w | Total Sty. Tapering, % | Melt Flow Index[1] (g/10 min) |
|---|---|---|---|---|---|
| 6329 | 6,900 | 73,200 | 22.4 | 83 | 4.7 |
| 6371 | 7,100 | 74,900 | 22.5 | 80 | 4.4 |
| 6372 | 7,200 | 77,100 | 22.6 | 82 | 3.2 |
| 6392 | 7,200 | 84,000 | 22.1 | 86 | 0.5 |
| 1527 | 7,000 | 76,700 | 22.4 | 85 | 2.2 |
| 1528 | 6,950 | 75,900 | 22.1 | 85 | 2.4 |
| 1529 | 6,840 | 75,300 | 22.2 | 85 | 2.5 |
| 1530 | 6,930 | 76,300 | 22.2 | 82 | 3.8 |

[1]ASTM D1238. 230° C./5 kg.
[2]Peak molecular weight

We claim:

1. A process for producing an anionic block polymer which comprises:
    (a) optionally anionically polymerizing styrene to form a polystyrene homopolymer block,
    (b) anionically polymerizing isoprene to form a polyisoprene homopolymer block,
    (c) anionically polymerizing a mixture of styrene and isoprene wherein each of the monomers is introduced at a rate of 15% to 75% by weight of the total tapered block monomer charge per minute and the weight ratio of the styrene to the isoprene is from 0.5:1 to 1.5:1.

2. The process of claim 1 wherein the monomer introduction rate in step (c) is 15 to 50% by weight of the total tapered block monomer charge per minute.

* * * * *